April 25, 1961  E. ALBERS-SCHOENBERG  2,981,689
SQUARE LOOP FERRITES
Filed July 12, 1954
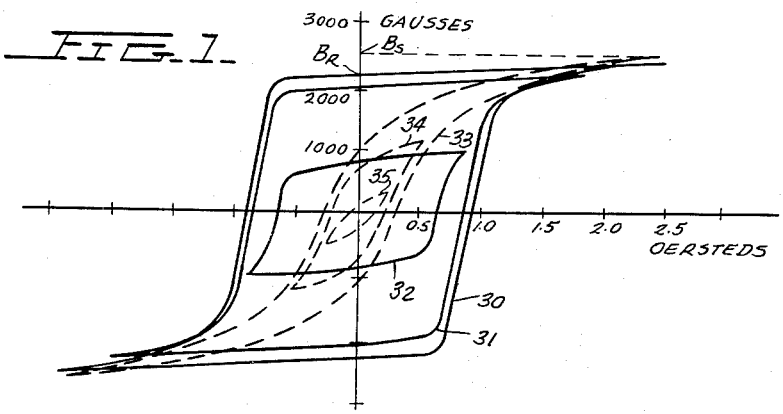
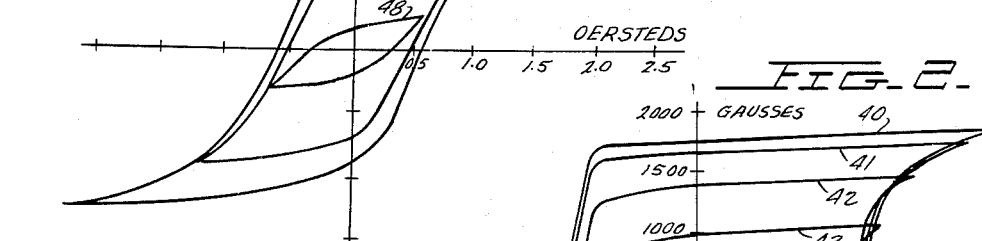
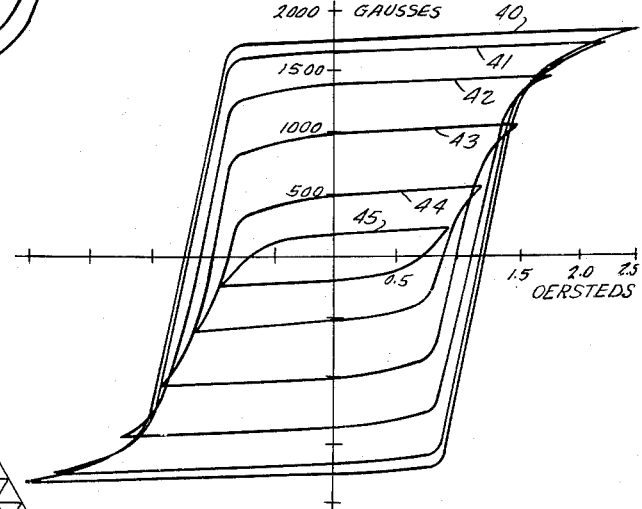
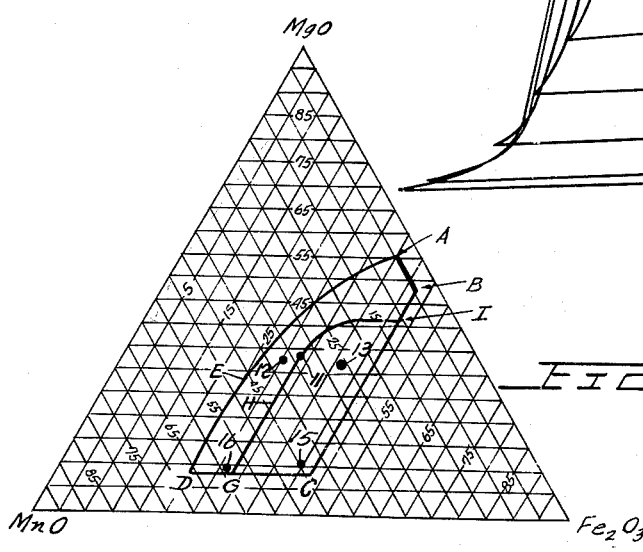
INVENTOR.
ERNST ALBERS-SCHOENBERG
BY Greene, Pineles & Dush
ATTORNEYS United States Patent Office 2,981,689
Patented Apr. 25, 1961

2,981,689
SQUARE LOOP FERRITES

Ernst Albers-Schoenberg, Metuchen, N.J., assignor to Steatite Research Corporation, Keasbey, N.J., a corporation of Delaware Filed July 12, 1954, Ser. No. 442,534

Claims priority, application Canada Feb. 3, 1953

6 Claims. (Cl. 252—62.5)

This invention relates to the production of ferromagnetic ceramic bodies which have hysteresis loops of substantially square or rectangular shape and to the bodies so produced.

Among the objects of the invention is to provide a approach very closely to a square or rectangular shape.

Among other objects of the invention is to provide a ceramic type of ferromagnetic material which has a substantially square or rectangular hysteresis loop and a very high speed of action, for example of the order of one micro-second or less.

These and other objects ancillary thereto are obtained by making a ceramic ferrite material consisting primarily of a magnesium-manganese ferrite having a deficiency in trivalent iron and having certain other limitations which will be more clearly understood when explained in connection with the accompanying drawing in which:

Fig. 1 is a composite view which reproduces the families of hysteresis loops of two different ferrites.

Fig. 2 is a view of a family of six hysteresis loops of a ferrite of the invention.

Fig. 3 is a view of a family of three hysteresis loops of another zinc-containing ferrite.

Fig. 4 is a triaxial diagram showing within the enclosed areas the mol percent of the magnesia, manganese oxide and ferric oxide, components which are suitable as square loop materials.

This application is a continuation-in-part of application Serial No. 270,351, filed February 7, 1952, which in turn is a continuation-in-part of application Serial No. 253,779, filed October 30, 1951, which itself is a continuation-in-part of application Serial No. 67,752, filed December 28, 1948, now all abandoned. In the latter application ferromagnetic bodies consisting mainly of bivalent magnesium oxide and trivalent iron oxide, the ratio of the two oxides being between 1.2:1 and 3:1, have been disclosed. In the manufacture of these bodies the proper ingredients are thoroughly mixed, molded and fired at the ceramic curing temperature. The resultant products are distinguished by their high insulating properties especially when the firing temperature has not been too high. In order to decrease the firing temperature, a third component, manganese oxide, zinc oxide, or similar fluxing ovide in the proportion of a few percent by weight was proposed. In the application Serial No. 253,779 and in application Serial No. 270,351 it has been explained that bodies of the three-oxide-system MgO—MnO—Fe$_2$O$_3$ have a very unusual and interesting property in that they have a rectangular or square hysteresis loop. Application Serial No. 253,779 differs from application Serial No. 270,351 primarily in that the preferred ranges of the components in the 270,351 application is broader than in the other application. This application differs from 270,351 in that the broad preferred range of components is somewhat more restricted than in said application Serial No. 270,351.

The terms "rectangular," or "square hysteresis loop" or "square loop ferrites" require some explanation as these are terms which have been adopted to describe a hysteresis loop which only approaches the square or rectangular shape and the ferrite material which has such a hysteresis loop. The desirable properties which the so-called square loop ferrites exhibit in their hysteresis loops are as follows:

(1) The $$\frac{B_r}{B_s}$$

ratio should be as close to unity as possible. If the hysteresis loop were absolutely square or rectangular the ratio would be unity but this ideal ratio is practically unattainable. For purpose of this specification the loop is considered to be rectangular or square if the $$\frac{B_r}{B_s}$$

ratio is about 0.8 or more.

(2) The hysteresis loop should be steep, or in other words the differential permeability $$\frac{dB}{dH}$$

should be large.

(3) The corners of the hysteresis curve should be sharp, or in other words, there should be a distinct part of sudden directional change in the curve. In use, the sharp cornered materials give an effect similar to the sudden snapping in a mechanical switch and since these ferrites are used to produce effects analogous to switching this property is very important.

Other desirable properties are that (4) the coercive force be relatively low and (5) that the saturation flux density be relatively high. The saturation flux density of over 1200 gausses is desirable.

Magnetic materials having these properties have found particular applications in computer and magnetic memory systems. In general, the function of square loop cores in such a system operates as follows:

The core material is magnetized and then excitation removed so that the magnetic state of the core is at retentivity ($B_r$) or at remanence. If a current pulse of short duration and suitable polarity is then applied which is large enough to drive the material in the opposite direction, a voltage output on a separate winding can be taken off due to the change of flux in the core. By arranging a set of these magnetic cores in some kind of array, basic numerical data can be stored for use in mathematical operations. Certain ferromagnetic metals can be used for this purpose if they are very thinly laminated, but the eddy current losses and shielding effects make the response time of these materials relatively long. On the other hand, the "square loop" ferrites with their high resistivities have shortened the response time of magnetic memory systems by a ratio of about 40 to 1, thus allowing the systems to be operated at much higher speeds of performance.

The three curves 30, 31, 32 of Fig. 1 are a family of hysteresis loops as traced on the screen of an oscilloscope from a typical square loop ferrite. The actual ferrite employed for this family of curves was one prepared according to Example 4 below, the composition of which corresponds to point 15 on the diagram of Fig. 4. The three curves 33, 34, and 35 in dotted lines are superposed on this figure to show a family of hysteresis loops of a typical ferrite under the same conditions as the ferrite of curves 30, 31 and 31. The ferrite employed for curves 33, 34, 35 consists of ferric oxide, manganese oxide and magnesium oxide with 17 weight percent of zinc oxide.

Whereas the saturation flux density ($B_s$) of curves 30 and 33 is approximately the same (around 2500), the remanence, $B_r$ of curve 30 is around 2200, whereas the remanence, $B_r'$, of curve 33 is only about 1050. The corresponding $B_r/B_s$ ratios are approximately .88 and .42, respectively. It will be noted that curves 33, 34 and 35 have no upper left hand or lower right hand corners at all.

The family of curves 40–45 of Fig. 2 was obtained from a ferrite made according to the invention with a mol ratio of 22.8% MgO, 34% MnO and 43.2% of $Fe_2O_3$. This composition is about half way between points 13 and 15 in Fig. 4.

Fig. 3 illustrates what happens if the minimum proportions of zinc oxide are only slightly exceeded. The ferrite of Fig. 3 contains manganese oxide, magnesium oxide and ferric oxide together with 10% by weight of zinc oxide. Although the $B_r/B_s$ ratio of this body as determined from curve 46 is slightly greater than 0.7 the corners of the loop are too rounded to satisfy the requirements for a square loop ferrite.

The proportions of the components in the $MgO$—$MnO$—$Fe_2O_3$ system which produce square loop ferrites are those within the area A—B—C—D—E—A of Fig. 4 of the drawing. It will be seen that such products have a maximum of 47.5 mol percent of iron oxide, a minimum of 8 mol percent of magnesium oxide and a minimum of 4 mol percent of manganese oxide, these values enclosing three sides of a four-sided area. The fourth side D—E—A is not a straight line and it is in this respect that this application differs from prior application Serial No. 270,351. The minimum amount of iron oxide as shown by portion D—E of side D—E—A is 25 mold percent but when the amount of magnesia is increased beyond about 20 mol percent the minimum proportion of iron oxide must also be increased. When the amount of magnesia is increased to 40 mol percent, for example, the iron oxide must have a minimum proportion of 28 mol percent. At 45 mol percent of MgO the iron oxide must be a minimum of about 30 mol percent; at 50 mol percent of magnesia the iron oxide must be at a minimum of about 34 mol percent; and at 55 mol percent of magnesia (the maximum MgO permissible under any conditions) the iron oxide must be at a minimum of about 41 mol percent.

The preferred range of mol percentage of the components is within the area C—G—H—I—C. This area is bound by straight lines C—I showing a maximum of 47.5% of iron oxide, straight line C—G showing a minimum of 8% of MgO, straight line GH showing a minimum of 33% of iron oxide; and curved line HI which indicates that the amount of magnesia may increase to a maximum of about 42 mol percent when the iron oxide content is between 40 and 47.5%.

Examples of metal oxides which can be substituted for a portion of the magnesia or manganese oxide are bivalent metal oxides, copper oxide, nickel oxide, zinc oxide, cadmium oxide, calcium oxide, and the univalent lithium oxide.

These oxides can be added in maximum amounts of about 5% by weight, except that for ZnO, the maximum may be a little higher, up to 8%. Higher percentages must be strictly avoided. As increasing amounts of zinc oxides are added to such compositions, for example, the corners of the hysteresis loop begin to round off. Additional fluxing may be obtained also by substituting magnesium fluoride for a portion of the magnesium oxide. The small silica addition of up to 4% by weight improves the insulating properties of the composition.

In the following examples the components are listed consistently as MgO, $MnO_2$, $Fe_2O_3$, ZnO, etc. $MnO_2$ has been chosen as prototype of a manganese oxide, because it is available as a pure reagent of a well defined oxygen content. It goes without saying that, in accordance with general rules of ceramic chemistry, other compounds may be used just as well, thus, for instance $MgCO_3$ instead of MgO, or $Mn_3O_4$ instead of $MnO_2$. ($MnO_2$ decomposes in the firing process and the manganese component in the fired body is an oxide of lower oxygen content, MnO or $Mn_3O_4$.)

The specific examples illustrate how the products are prepared and fired and set forth the essential properties of typical compositions within the areas set forth in Fig. 4.

*Example 1 (according to point 11)*

A mix is prepared of the following ingredients in the proportions indicated:

|  | Percent by weight | Approx. mol percent |
|---|---|---|
| MgO | 14 | 33.5 |
| $MnO_2$ | 30 | [1] 33. |
| $Fe_2O_3$ (red iron oxide) | 56 | 33.5 |

[1] As MnO.

The mix is wet ballmilled to obtain a finely divided and thoroughly mixed composition. To the resultant powder a small amount of a binder such as methyl cellulose and water are added, if necessary, and the material is shaped by pressing or extruding. The product is then fired in nitrogen at approximately 2300° F.

The resulting product has the following properties:

Saturation flux density ($B_s$) _____ gausses__ 1650
Residual magnetism ($B_r$) _____ do____ 1375
$B_r/B_s$ _____ .83
Coercive force _____ oersted__ 2.1
Maximum permeability _____ 315
Initial permeability _____ 60

*Example 2 (according to point 12)*

A shaped body is made in accordance with the process set forth in the foregoing description, with the following starting materials:

|  | Percent by weight | Approx. mol percent |
|---|---|---|
| MgO | 14 | 32.5 |
| $MnO_2$ | 35 | [1] 37.5 |
| $Fe_2O_3$ | 51 | 30.0 |

[1] As MnO.

The shaped body is prefired in air at 1400° F. and then finally fired at 2250° F. in a nitrogen atmosphere. The properties of the resultant product are:

Saturation flux density ($B_s$) _____ gausses__ 1475
Residual magnetism ($B_r$) _____ do____ 1250
$B_r/B_s$ _____ .85
Coercive force _____ oersteds__ 1.4
Maximum permeability _____ 410
Initial permeability _____ 52

*Example 3*

The composition at point 13 is as follows:

|  | Percent by weight | Approx. mol percent |
|---|---|---|
| MgO | 12.5 | 32.5 |
| $MnO_2$ | 22.5 | [1] 24 |
| $Fe_2O_3$ | 65 | 43.5 |

[1] As MnO.

This composition, fired in air at about 2350° F., gives a product with the following properties:

Saturation flux density ($B_s$) _____ gausses__ 2438
Residual magnetism ($B_r$) _____ do____ 2130
$B_r/B_s$ _____ .91
Coercive force ($H_c$) _____ oersteds__ 1.57
Max. permeability _____ 704
Initial permeability _____ 43

Example 4

Point 15 represents a composition of low magnesia content which still has a square hysteresis loop although the horizontal parts are slightly more rounded than in the preceding bodies. This body has the following composition:

|  | Percent by weight | Approx. mol percent |
|---|---|---|
| MgO | 3 | 10 |
| MnO₂ | 34 | 14[1] |
| Fe₂O₃ | 63 | 45 |

[1] As MnO.

The properties of the body of this composition are as follows:

Saturation flux density ($B_s$) _____ 2900
Residual magnetism ($B_r$) _____ 2500
$B_r/B_s$ _____ 0.86
Coercive force _____ 0.9
Maximum permeability _____ 1300
Initial permeability _____ 185

Example 5

Point 16 shows a low iron, low magnesia body. The composition is as follows:

|  | Percent by weight | Approx. mol percent |
|---|---|---|
| MgO | 3.8 | 10 |
| MnO₂ | 47.8 | 57[1] |
| Fe₂O₃ | 48.5 | 33 |

[1] As MnO.

To this mixture 1.5% by weight of $CaF_2$ and 2% by of $MgF_2$ are added. These additions promote crystallization of the ferrite body and produce a body having a hysteresis loop with better corners than a product made without such additions. Either the $CaF_2$ or the $MgF_2$ can be used alone for this purpose.

When fired in air and reheated in neutral atmosphere at about 2350° F. the product had the following properties:

Saturation flux density _____ 2000
Residual magnetism _____ 1750
Maximum permeability _____ 1450
$B_r/B_s$ _____ .88

Example 6

This example and Example 7 illustrate the effect obtained by the substitution of zinc oxide for a portion of the bivalent oxides.

|  | Percent by weight | Approx. mol percent |
|---|---|---|
| MgO | 6.5 | 18 |
| ZnO | 6 | 8 |
| MnO₂ | 22.5 | 29 |
| Fe₂O₃ | 65 | 45 |

The samples were fired in air at around 2350° F. and the products had the following characteristics:

Saturation flux density _____ 2800
Residual magnetism _____ 2400
$B_r/B_s$ _____ 0.86
Coercive force _____ 0.7
Maximum permeability _____ 1400
Initial permeability _____ 185

Example 7

A composition with the following components were mixed and fired as in Example 6.

|  | Percent by weight | Approx. mol percent |
|---|---|---|
| MgO | 9 | 23.8 |
| ZnO | 8 | 10.5 |
| MnO₂ | 19.5 | 23.7 |
| Fe₂O₃ | 63.5 | 42.1 |

The fired body had the following characteristics:

Saturation flux density _____ gausses__ 2650
Residual magnetism _____ do____ 2350
$B_r/B_s$ _____ .89
Coercive force _____ oersted__ .6
Maximum permeability _____ 1500
Initial permeability _____ 90

The following generalizations have been drawn from experiments with compositions close to the borders of the area ABCDEA of Fig. 4. Approaching line DC, toward low magnesia compositions, the saturation flux density, residual magnetism, maximum and initial permeability are increased while coercive force decreases, especially along the high iron side of the line. Thus, these bodies have long steep, narrow hysteresis loops but still have good corners as long as the $Fe_2O_3$ content is not above 47.5 mol percent. Below line DC, the low magnesia bodies, the corners start to round off. As a general rule the bodies toward the line DC also have a longer response time than the bodies of higher magnesia content. A body made of a composition close to the line DC may have a response time as long as 5 microseconds whereas the bodies in the central part of the area ABCDEA would have a response time of 0.5-1.5 microseconds.

The bodies close to the line DEA have still some squareness but they do not have high saturation values. Thus, the hysteresis loops of such bodies are shorter and wider. Low saturation bodies are a requirement of some computer systems.

As indicated above when the bodies contain more than 47.5 mol percent of iron oxide or are outside line BC the corners begin to round off again. Preferably, the bodies contain no more than 47.5 mol percent of iron.

Outside of the line AB the products are difficult to obtain with any degree of uniformity.

The features and principles underlying the invention described above in connection with specific exemplifications will suggest to those skilled in the art many other modifications thereof. It is accordingly desired that the appended claims shall not be limited to any specific feature or details thereof.

I claim:

1. A fired ferromagnetic ferrite body having a square hysteresis loop consisting essentially of a manganese-magnesium ferrite and consisting essentially of 8–55 mol percent of magnesia, 4–67 mol percent of manganese oxide and from 25 to about 47.5 mol percent of ferric oxide, the proportions of said components being within the A—B—C—D—E—A of Fig. 4 of the drawing.

2. A fired ferromagnetic ferrite body having a square hysteresis loop consisting essentially of a manganese-magnesium ferrite consisting essentially of 8–42 mol percent of magnesia, 11 to 59 mol percent of manganese oxide and from 33 to about 47.5 mol percent of ferric oxide, the proportions of said components being within area C—G—H—I—C of Fig. 4 of the drawing.

3. A ferromagnetic ferrite body having a square hysteresis loop consisting essentially of a manganese-magnesium ferrite consisting essentially of 8 to 55 mol percent of magnesia, 4–67 mol percent of manganese oxide, from 25 to about 47.5 mol percent of ferric oxide and up to 8% by weight of the composition of zinc oxide, the proportions of magnesia, manganese oxide and ferric oxide being within area A—B—C—D—E—A of Fig. 4 of the drawing.

4. The ferromagnetic ferrite as claimed in claim 3 in which the proportions of magnesia, manganese oxide and ferric oxide are within area C—G—H—I—C of Fig. 4 of the drawing.

5. A ferromagnetic ferrite body having a substantially square hysteresis loop formed by firing a mixture of magnesium, manganese and ferric oxides in the proportions of about 8–27 mol percent magnesium oxide, 33–62 mol percent manganese oxide and 30–47.5 mol percent ferric oxide.

6. A ferromagnetic ferrite body having a square hysteresis loop consisting essentially of a manganese-magnesium ferrite consisting essentially of 8 to 55 mol percent of magnesia, 4–67 mol percent of manganese oxide, from 25 to about 47.5 mol percent of ferric oxide and an oxide selected from the group consisting of copper oxide, nickel oxide, zinc oxide and lithium oxide, the copper oxide, nickel oxide and lithium oxide being present in an amount not greater than 5% by weight of the composition and the zinc oxide being present in an amount not greater than 8% by weight of the composition.

References Cited in the file of this patent

UNITED STATES PATENTS 2,640,813    Berge _____ June 2, 1953

OTHER REFERENCES

Physica, vol. 3, No. 6, June 1936, pp. 463–483.

UNITED STATES PATENT OFFICE
CERTIFICATION OF CORRECTION

Patent No. 2,981,689                              April 25, 1961

Ernst Albers-Schoenberg

It is hereby certified that error appears in the above numbered patent requiring correction and that the said Letters Patent should read as corrected below.

In the heading to the printed specification, line 7, strike out "Claims priority, application Canada Feb. 3, 1953"; column 1, line 20, after "a" insert -- ferromagnetic material having hysteresis loops which --; line 59, for "ovide" read -- oxide --; column 2, line 70, for "31", second occurrence, read -- 32 --; column 3, line 33, for "mold" read -- mol --; column 5, line 40, after "by", second occurrence, insert -- weight --; column 6, line 62, after "the", first occurrence, insert -- area --.

Signed and sealed this 24th day of October 1961.

(SEAL)
Attest:

ERNEST W. SWIDER                            DAVID L. LADD
Attesting Officer                         Commissioner of Patents